March 17, 1953 C. W. LINCOLN ET AL 2,631,467
TRANSMISSION CONTROL
Filed Nov. 2, 1950 2 SHEETS—SHEET 1

Inventors
Clovis W. Lincoln,
Philip B. Zeigler &
Ralph A. Malone
By Willits, Helwig & Baillio
Attorneys.

Patented Mar. 17, 1953

2,631,467

UNITED STATES PATENT OFFICE 2,631,467

TRANSMISSION CONTROL

Clovis W. Lincoln and Philip B. Zeigler, Saginaw, and Ralph A. Malone, Chesaning, Mich., assignors to General Motors Corporation, Detroit, Mich., a corporation of Delaware Application November 2, 1950, Serial No. 193,712

18 Claims. (Cl. 74—484)

This application relates to an improved gearshift control mechanism and an improved mounting on the steering column.

The applicant's invention is illustrated in connection with a gearshift control mechanism mounted concentrically within the steering column of a motor vehicle. A hand control lever mounted in the conventional location beneath the steering wheel is connected to the control tube mounted concentrically within the steering column to rotate and reciprocate the control tube. The control tube extends through the steering column to the lower end below the floor boards of the vehicle and above the steering gear. The lower end of the control tube is supported in a bearing attached to the steering column and has attached thereto a clutch element. A pair of clutch rings surround the control tube and are supported by washers at the top and bottom. The top washer is secured to the upper portion of the steering column and the lower washer is resiliently supported on the top edge of the lower steering column portion which telescopes within the upper portion. This construction provides an automatic arrangement to take up clearance between the parts of the mechanism caused by dimensional variations within the manufacturing tolerances. The actuating levers are integrally formed on the clutch rings and extend through a slot in the upper steering column section.

The primary object of this invention is to provide an improved and simplified gearshift control assembly which may be easily assembled.

Another object of this invention is to provide in a gearshift control mechanism mounted within a steering column a pair of transmission actuating members rotatably supported within the steering column.

A further object of this invention is to provide in a gearshift control mechanism mounted in a steering column a resilient support for the control mechanism to automatically allow for variations in size of the parts of the order of the manufacturing tolerances.

A further object of the invention is to provide a transmission control mechanism in which a rotatably mounted controlled member is laterally supported between two sections of the steering column.

These and other objects of the invention and the manner in which they are achieved will be more fully apparent from the appended description of the preferred embodiment of the invention and the accompanying drawings.

Figure 1:
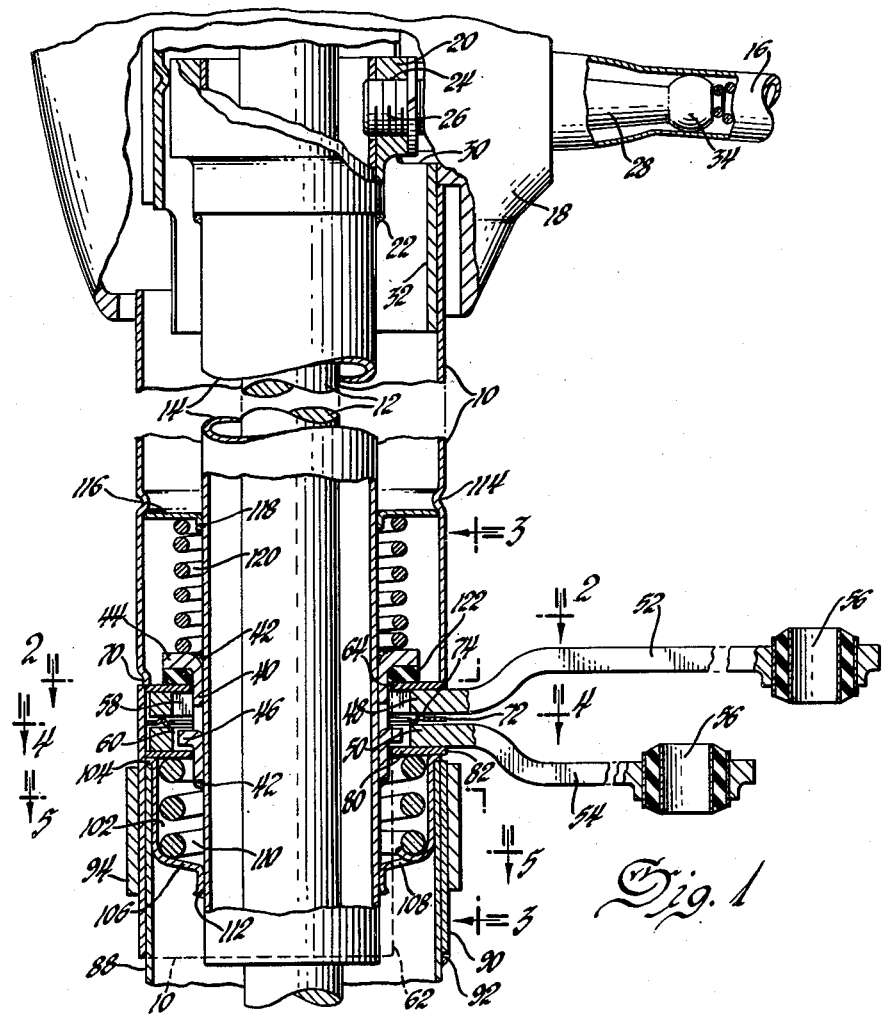
Figure 1 is a partial view of a gearshift control mechanism mounted within a steering column with parts broken away and in section to show the details of the invention.

The gearshift control mechanism mounted concentrically within the steering column of the automotive steering gear mechanism illustrates a preferred application of the invention to a conventional automotive installation. The invention may be employed in the controls for other machinery where a control tube housed within a cylindrical column is alternately clutched to one of two rotating levers mounted within the column. The preferred embodiment which incorporates this structure within an automotive steering column has been illustrated in Figure 1. The cylindrical steering column has an upper portion 10 which is secured to the automobile frame in the conventional manner. The steering shaft 12 is supported by a bearing (not shown) attached to a cylindrical extension 32 of the steering column 10 and located concentrically within the steering column. The control tube 14 is mounted concentrically between the steering shaft 12 and the steering column 10. At the upper end of the steering column 10, a hollow hand control lever 16 is suitably mounted on the steering column and interconnected to the control tube 14 to rotate the control tube and to axially reciprocate the control tube. The hand control lever 16 may be connected to the control tube 14 by a number of known mechanisms. One form of interconnecting mechanisms between the hand control lever and the control tube which has been used for illustrative purposes is completely disclosed in the copending application S. N. 197,956, filed November 28, 1950, of Clovis W. Lincoln, Philip B. Zeigler, and Henry D. Spiekerman entitled Transmission Control. The main features of this construction as illustrated in Figure 1 of the accompanying drawings consists of a bowl member 18 rotatably mounted on the top end of the steering column 10 by bearings (not shown). The hand control lever 16 is pivotally connected to the side of the bowl 18 by a suitable pivoted joint (not shown). A cylindrical reinforcing member 20 is secured to the top end of the control tube 14 by suitable means such as welding 22. The reinforcing member 20 has a suitable threaded aperture 24 to receive the threaded end 26 of arm 28. The arm 28 which is thus fixed to the control tube 14 extends outwardly through an aperture 30 in the steering column extension 32 and through an aperture in the bowl 18 and into the hollow portion of the handle 16. The arm 28 has a rounded ball 34 at the end which provides a bearing surface for the pivotal connection between the arm and the lever 16. Thus in the conventional manner movement of the arm 16 axial with the steering column will axially reciprocate the control rod 14 and rotary movement of the arm 16 about the steering column axis will rotate the control rod 14 about the steering column axis.

Figure 7:
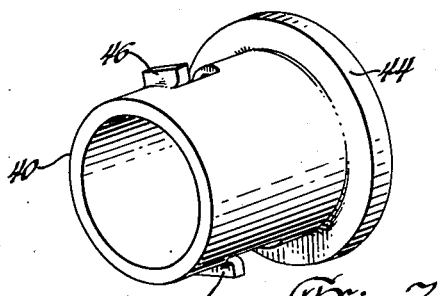
Figure 7 is a perspective view of a clutch element.

The control tube 14 is cylindrical and extends down to the lower end of the steering column 10 where a clutching mechanism is provided to connect the control tube to either of two levers rotatably mounted on the steering column. Adjacent the lower end of the control tube 14 a cylindrical clutching member 40 is secured by welding 42 to the control tube. Suitable stop means such as flange 44 protrudes from the top edge of the cylindrical clutch member 40 as illustrated in detail in Figure 7. Adjacent the center of the clutch member 40, two diametrically opposed clutching dogs 46 extends from the cylindrical surface of the clutch member 40. It will also be noted that the clutch member has an outer cylindrical bearing surface for a purpose to be described below. These dogs may be suitably formed on the cylindrical clutching member by bending the material within the base portion of a U-shaped slit outwardly to form the clutching dog 46.

Figure 2:
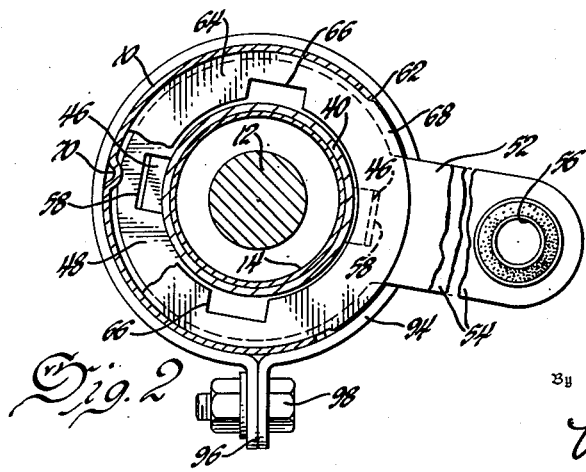
Figure 2 is a sectional view of Figure 1 taken on the line 2—2.
Figure 3:
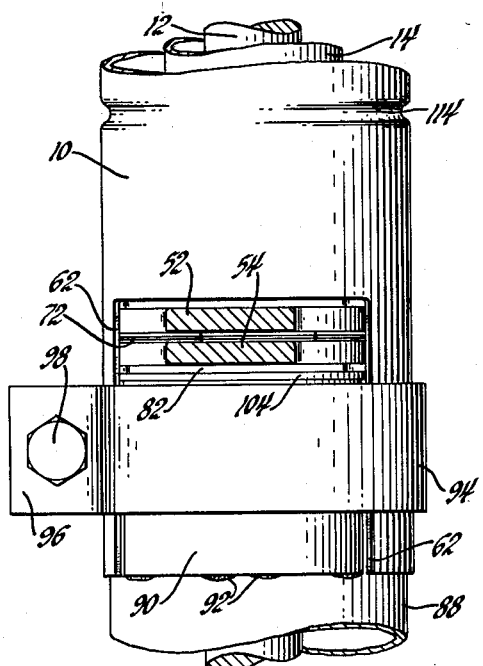
Figure 3 is a partial elevation of the invention taken along the line 3—3 of Figure 1.
Figure 4:
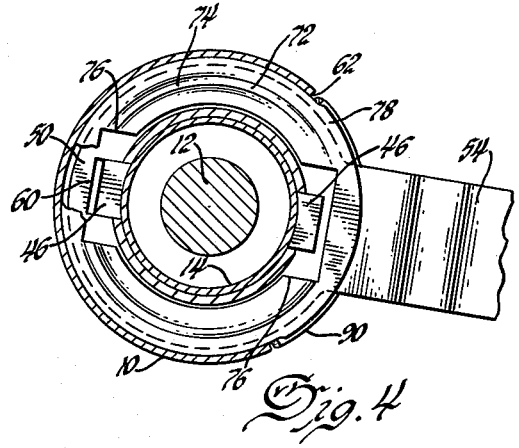
Figure 4 is a partial sectional view of Figure 1 taken on the line 4—4.
Figure 5:
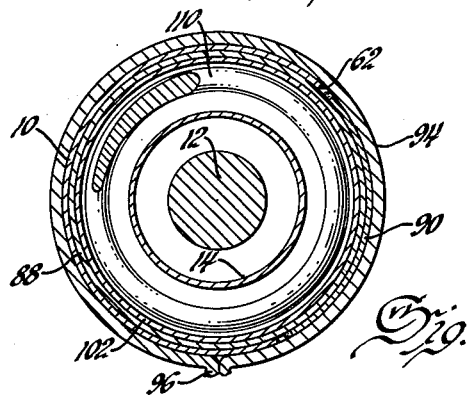
Figure 5 is a partial sectional view of Figure 1 taken on the line 5—5.
Figure 6:
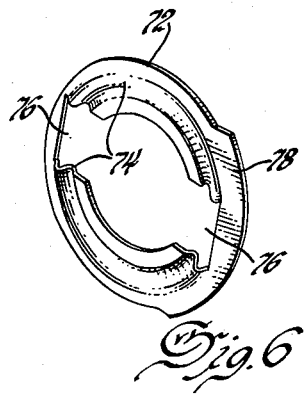
Figure 6 is a perspective view of a spacer element.

An upper clutch ring 48 and a lower clutch ring 50 surround the clutching member 40 and are supported in the steering column 10. The inside surface of the clutch rings or controlled members are finished to provide a cylindrical bearing surface to rotate and slide on the bearing surface of the clutch member 40. However it will also be appreciated that the clutch rings 48 and 50 may have bearing engagement with the steering column 10 or both the clutch member and the steering column. As illustrated in Figure 1, the upper clutch ring 48 has an integral arm 52 attached thereto and the lower clutch ring 50 has a similar integral arm 54 attached thereto. Suitable bushings 56 are provided in the ends of these arms for connection through a rod or linkage mechanism to the transmission. The clutch ring 48 has diametrically opposed slots 58 which engage the clutch dogs 46 and the lower clutch ring 50 has diametrically opposed slots 60 for similarly engaging the clutch dogs 46. The lower end of the upper steering column portion 10 has a recess 62 extending inwardly from the lower edge to provide an outlet opening for the control levers 52 and 54. The upper clutch ring 48 is supported at the upper side by a support washer 64. This washer 64 as illustrated in Figure 2 has a generally annular shape with diametrically opposed slots 66 which allow the washers to be inserted in its position past the locking clutch dogs 46. The outside periphery of the washer has a generally circular shape with a small arcuate protrusion 68 extending throughout the arcuate length of the recess 62 and merely uniformly increasing the width of the washer by the thickness of the wall of the steering column 10. The extension 68 on the annular washer 64 engages the upper edge of the recess 62 and thus in conjunction with a tongue 70 bent inwardly from the steering column 10 opposite the recess 62 provides a support to prevent upward displacement of the annular support washer 64. The extension 68, in addition to providing a support by its extending into recess 62, prevents rotary movement of the washer 64 in the steering column 10. A separator or bearing washer 72 is positioned between the upper clutch ring 48 and the lower clutch ring 50 to provide a bearing between the clutch rings. It will be seen that the bearing washer 72 has annular undulations 74 to provide a spring action so that slack between the clutch rings may be resiliently taken up by the bearing washer 72. Referring to Figure 4 it will be seen that bearing washer 72 has opposed enlarged recesses 76 so that the clutch dogs 46 will clear the bearing washer 72 in any rotative position used to shift gears. The bearing washer 72 also has an arcuate extension 78 which extends into the recess opening 62 a distance equal to the wall thickness of the steering column 10 to prevent rotation of the bearing washer.

The clutch ring 50 is supported on its lower side by a lower support washer 80 which is the same as upper support washer 64. The support washer 80 has an annular projection 82 which fits into the recess 62 and extends a distance equal to the wall thickness of the steering column 10. This projection engages the sides of recess 62 to prevent rotation of the support washer 80. The lower support washer 80 is resiliently supported to automatically take up the clearance caused by dimensional variations within the manufacturing tolerances of the structural members of this assembly. The lower portion 88 of the steering column telescopically fits within the lower end of the upper portion 10 of the steering column. A circumferential locating plate 90 is secured to the side wall of the lower portion 88 of the steering column by suitable means such as spot or edge welding 92. The locating plate 90 slides into the lower portion of the recess 62 of the upper steering column 10 and provides a cylindrical seat for clamp 94 when the lower steering column portion or part 88 is fitted within the upper steering column portion 10. As shown in Figure 2, the clamp 94 engages the outside of the lower end of the upper steering column 10 and the locating member 90 and clamps these elements into engagement with the upper end of the lower steering column 88. The clamp 94 is a conventional ring clamp with ears 96 and a fastening bolt 98 to contract the clamp about the steering column. A spring seat and bearing member 102 having a generally cylindrical main body portion is positioned within the lower steering portion 88 of the steering column. The seat member 102 has at its upper end an outwardly directed annular flange 104 having a width equal to the thickness of the wall of the lower portion of the steering column 88. The flange 104 seats on the top edge of the lower portion 88 of the steering column and provides a support and securing means for the seat member 102. At the lower end of the seat member 102 an inwardly directed annular flange 106 which may have seat tongues 108 upwardly depressed from the metal engages the bottom of coil spring 110. This spring is continuously under a high compression and engages the lower side of the lower support washer 80. Thus the assembly consisting of the support washers and the clutch rings is constantly under pressure to eliminate all unnecessary clearance. At the inner edge of the inwardly directed flange 106 on the spring seat member 102 there is also an axial flange extension 112 which provides a bearing for the lower end of the control tube 14.

The steering column 10 is deformed to provide an inwardly projecting annular ridge 114 just above the opening 62 for the levers 52 and 54. The ridge 114 provides a support above the spring seat 116. The annular spring seat 116 may have at its inner edge an axially directed cylindrical flange 118 which not only helps to locate the spring on the seat 116 but also provides additional bearing support for the control tube 114. A coil spring 120 under compression seats at one end on the spring seat 116 and at the other end engages the upper stop flange 44 on the clutch member 40 attached to the control tube 14. Thus the control tube 14 is continuously urged downwardly. In order to prevent shock and noise an annular rubber bumper 122 is positioned between the stop flange 44 and the upper support washer 64 which provides an abutment for the stop flange 44.

The control mechanism consists of a rotatably and reciprocatably mounted control tube 14 mounted on suitable bearings with the steering column structure 10. The control tube 14 is suitably connected to a hand control lever 16 which is mounted on the bowl structure 18 at the top of the steering column for rotary movement about the steering column axis, and for reciprocating movement axially of the steering column. The hand control lever 16 is suitably pivoted at its inner end to a bowl structure 18 which is rotatably mounted on the steering column. The hand lever is also pivotally connected intermediate its length to an arm 28 which is rigidly fixed to the upper end of the control tube 14. Thus when the hand control lever 16 is rotated, the whole assembly consisting of the hand control lever 16, the arm 28, the bowl 18 and the control tube 14 is rotated about the steering column axis. When the hand control lever 16 is reciprocated, it pivots about the pivotal connection between the hand control lever and the bowl 18 and raises and lowers the outer end of the arm 28. Since this arm is rigidly connected to the control tube 14, the control tube is reciprocated along the steering column axis.

At the lower end of the control tube, a clutching member 40, having clutch dogs 46 and a cylindrical bearing surface, is secured to the tube. The clutch dogs 46 are moved from the slot 58 of the clutch ring 48 to the slot 60 of the clutch ring 50 by reciprocating movement of the control tube 14. Thus reciprocating the hand lever 16 and the control tube 14 selects whether lever 52 or 54 will be actuated to shift gears in the transmission. Then when the hand control lever 16 is rotated, the lever which has previously been selected will be rotated in the same direction as the hand control lever 16 is rotated to shift the selected gears. Thus when the clutching dog 46 is in engagement with the slot 58, the lever 52 will be rotated and when the dog is in engagement with the slot 60, the lever 54 will be rotated. When the levers rotate, their clutch ring portion has an inner cylindrical bearing surface which bears on the outer cylindrical bearing surface of the clutch member 40.

In order that this mechanism may be easily assembled, the upper support washer 64 has oppositely disposed slots 66 which allow the washer to be moved past the clutching dogs 46 of the clutch member 40. However, when the upper support washer 64 is placed in its final position as determined by the extension 68 fitting into the recess 62, the slots 66 are rotated 90° from the clutch dogs 46 as best illustrated in Figure 2. Thus the support washer 64 in addition to providing a support for the clutch ring 48 will prevent excessive movement of the clutch member 40 by limiting the upper movement of the clutch dogs 46. The bearing and spacer washer 72 has enlarged slots 76 so that it will not interfere with the movement of the clutch dogs 46. Though it is not necessary in the assembly of the device, it is practical to make washers 80 and 64 identical and thus washer 80 will generally have slots located at 90° from normal position of the locking dogs 46. The lower washer 80 has a similar extension 82 which prevents rotation. If due to the normal variations within the manufacturing tolerances of the steering column structure, the upper edge 104 of the spring seat does not engage the lower support washer 80, the spring 110 will engage the support washer and thus support the clutch and lever assembly. In this way all the steering column assemblies may be made exactly the same length though there is some variation in the dimensions of the structural part of the steering column and transmission control assembly. It is also pointed out that these variations will not create a loose fit in the support and bearing members for the levers 52 and 54. The member 102 provides a seat for spring 110 which holds the lever and clutch ring assembly in position and provides a lower bearing member for the end of the control tube 14. The control tube 14 is also resiliently held in its lower position by a spring 120. Thus if the control mechanism is in neutral, that is when the slots 58 and 60 of clutch rings 48 and 50 are aligned then the control tube will be automatically returned to the lower position by the spring 120. When the control tube is not in neutral position, the clutch dogs 46 will engage the upper surface of the lower ring 50 and this will prevent the spring 120 from returning the lever to its lower position.

This detailed description of the preferred embodiment of the invention is not to be considered as limiting the invention since many modifications will occur to those skilled in the art within the scope of the invention as defined in the appended claims.

We claim:

1. In a control mechanism, a support column having two parts mounted for relative axial movement, a control member mounted for rotary and reciprocating movement on said support column, a controlled member, means to rotatably support said controlled member, and means having one support mounted on one part of said support column and another support mounted on another part of said support column to laterally support said controlled member on said steering column.

2. In a control mechanism, a support column having two parts mounted for relative axial movement, a control member mounted for rotary and reciprocating movement on said support column, a controlled member, means on said control member to rotatably support said controlled member, and means having one resilient support on one part of said support column and another support mounted on another part of said support column to laterally support said controlled member on said steering column.

3. In a control mechanism, a support column having two parts mounted for relative axial movement, a control member mounted for rotary and reciprocating movement on said support column, a controlled member, means on said control member to rotatably support said controlled member and means to laterally support said controlled member on said steering column consisting of a fixed support on one part and a resilient support on the other part to automatically take up for variances with the manufacturing tolerances.

4. In a control mechanism, a support column having an upper and a lower part mounted for relative axial movement, means to secure said upper and lower support column parts together, a control member mounted for rotary and reciprocating movement on said support column, a controlled member, means to rotatably support said controlled member, and means to laterally support said controlled member on said steering column consisting of an abutment on the upper part and an abutment on the lower part of the support column.

5. In a control mechanism, a support column, a control member mounted within said column for rotating and reciprocating movement, a clutch member mounted and secured to said control member, a pair of controlled members surrounding said control member, clutch means on said controlled members selectively engageable by said clutch member, and means resiliently engaging said controlled members and said support column to take up excessive clearance and to support the said controlled members on said support column.

6. In a control mechanism, a support column, a control member mounted within said column for rotating and reciprocating movement, a clutch member on said control member, a pair of controlled members, clutch means on said controlled members selectively engageable by said clutch member, and means resiliently engaging said controlled members and said support column to take up excessive clearance and to support the said controlled members on said support column.

7. In a control mechanism, a support column, a control member mounted within said column for rotating and reciprocating movement, a clutch member on said control member, a pair of controlled members surrounding said control member, clutch means on said controlled members selectively engageable by said clutch member, a support member engaging the outer surface of each of said controlled members, one of said support members being fixed to said support column, and a spring seated on said support column and resiliently engaging the other of said support members and holding said last mentioned support member in engagement with the adjacent controlled member.

8. In a control mechanism, a support column, a control member mounted within said column for rotating and reciprocating movement, a clutch member mounted and secured to said control member, a pair of clutch rings surrounding said control member, clutch means on said clutch rings selectively engageable by said clutch member, a lever connected to each of said clutch rings, a support engaging the outer surface of each of said clutch rings, one of said supports being fixed to said support column, and a spring seated on said support column and resiliently engaging the other of said supports and holding said last mentioned support in engagement with the adjacent clutch ring.

9. In a control mechanism, a support column, a control member mounted within said column for rotating and reciprocating movement, a clutch member mounted and secured to said control member, a pair of clutch rings surrounding said control member, clutch means on said clutch rings selectively engageable by said clutch member, a lever connected to each of said clutch rings, a support washer engaging the outer surface of each of said clutch rings, a resilient bearing washer engaging the inner surfaces of said clutch rings, one of said support washers being fixed to said support column, and a spring seated on said support column and resiliently engaging the other of said support washers and holding said last mentioned washer in engagement with the adjacent clutch ring.

10. In a control mechanism, a support column, a control member mounted within said column, a pair of controlled members, interengaging clutch means on said control member and said pair of controlled members to selectively engage either of said controlled members, a first support fixed to said support column engaging one of said pair of controlled members, a second support engaging the other of said pair of controlled members, a spring seat supported on said support column, and a spring on said spring seat engaging said second support to hold said controlled members together and in position in said support column.

11. In a control mechanism, a support column having an upper and a lower portion, means to secure said portions together, a control member mounted within said column, a pair of controlled members having rotary bearing engagement with said control member, interengaging clutch means on said control member and said controlled members to selectively engage either of said controlled members, a first support on said support column engaging the outside of one of said controlled members, a second support engaging the outside of the other controlled member, a spring seat supported on said lower portion of the support column, and a spring on said spring seat engaging said second support to hold said controlled members together and in position in said support column.

12. In a control mechanism, a support column having an upper and a lower aligned portion, means to secure said portions together, a control member mounted within said column, bearing means to rotatably and reciprocally support said control member, a pair of controlled members, interengaging clutch means on said control member and said controlled members to selectively engage either of said controlled members, a first support fixed to said support column engaging one of said controlled members, a second support engaging the other of said controlled members, a spring seat supported on said lower portion of the support column, and a spring on said spring seat engaging said second support to hold said controlled members together and in position in said support column.

13. In a control mechanism, a support column having an upper and a lower portion in telescoping relation, means to secure said portions together, a control member concentrically mounted within said column, bearing means to rotatably and reciprocally support said control member, a pair of controlled members surrounding said control member and having rotary bearing engagement therewith, interengaging clutch means on said control member and said pair of controlled members to selectively engage either of said controlled members, a first support fixed to said upper portion of said support column engaging the outside of one of said controlled members, a second support engaging the outside of the other controlled member, a spring seat supported on the top edge of said lower portion of the support column and a spring engaging said spring seat and said second support.

14. In a control mechanism, a support column having an upper and a lower portion in adjustable telescoping relation, means to secure said portions together, a control member concentrically mounted within said column, bearing means to rotatably and reciprocally support said control member, a pair of rings surrounding said control member and having rotary bearing engagement therewith, interengaging clutch means on said control member and said pair of rings to selectively engage either of said rings, a first support fixed to said upper portion of said support column engaging the otuside of one of said rings, and a second support engaging the outside of the other ring and supported on said lower portion of the support column.

15. In a control mechanism, a support column having an upper and a lower portion in telescoping relation, means to secure said portions together, a control member concentrically mounted within said column, bearing means to rotatably and reciprocally support said control member, a pair of rings surrounding said control member and having rotary bearing engagement therewith, interengaging clutch means on said control member and said pair of rings to selectively engage either of said rings, a first support fixed to said support column engaging the outside of one of said rings, a second support engaging the outside of the other ring, a spring seat supported on the top edge of said lower portion of the support column, and a spring on said spring seat engaging said second support to hold said rings together and in position in said support column.

16. In a control mechanism, a support column having an upper and a lower portion in telescoping relation, an opening in said support column, means to secure said portions together, a control member concentrically mounted within said column, bearing means to rotatably and reciprocally support said control member, a pair of rings surrounding said control member and having rotary bearing engagement therewith, interengaging clutch means on said control member and said pair of rings to selectively engage either of said rings, a pair of controlled means attached to said rings and extending through said opening, a first support fixed to said support column engaging the outside of one of said rings, a second support engaging the outside of the other ring, a spring seat supported on said support column, and a spring on said spring seat engaging said second support to hold said rings together and in position in said support column.

17. In a control mechanism, a support column, an opening in said support column, a control member concentrically mounted within said column, bearing means to rotatably and reciprocally support said control member, a pair of rings surrounding said control member and having rotary bearing engagement therewith, interengaging clutch means on said control member and said pair of rings to selectively engage either of said rings, a pair of controlled means attached to said rings and extending through said opening, a first support fixed to said support column engaging the outside of one of said rings, a second support engaging the outside of the other ring, said supports extending into said opening to prevent rotation, a spring seat supported on said support column, and a spring on said spring seat engaging said second support to hold said rings together and in position in said support column.

18. In a control mechanism, a support column, an opening in said support column, a control member concentrically mounted within said column, a pair of controlled members having rotary bearing engagement with the control member, interengaging clutch means on said control member and said pair of controlled members to selectively engage either of said controlled members, a pair of controlled means attached to said controlled members and extending through said opening, a first support fixed to said support column engaging the outside of one of said controlled members, a second support engaging the outside of the other controlled member, said supports extending into said opening to prevent rotation, a spring seat supported on said support column, and a spring on said spring seat engaging said second support to hold said controlled members together and in position in said support column.

CLOVIS W. LINCOLN.
PHILIP B. ZEIGLER.
RALPH A. MALONE.

REFERENCES CITED

The following references are of record in the file of this patent:

UNITED STATES PATENTS

| Number | Name | Date |
| --- | --- | --- |
| 2,170,794 | Chayne | Aug. 29, 1939 |
| 2,231,740 | Wharam | Feb. 11, 1941 |
| 2,282,962 | Hawkins et al. | May 12, 1942 |
| 2,301,484 | Wahlberg | Nov. 10, 1942 |
| 2,334,421 | Leach | Nov. 16, 1943 |